(12) United States Patent
Schuster

(10) Patent No.: US 6,982,120 B2
(45) Date of Patent: Jan. 3, 2006

(54) HARDENED STEEL COMPONENTS AND PROCESS OF TREATING THE SAME

(75) Inventor: Manfred Schuster, Rodgau (DE)

(73) Assignee: GKN Driveline Duetschland GmbH, (DE)

( * ) Notice: Subject to any disclaimer, the term of this patent is extended or adjusted under 35 U.S.C. 154(b) by 0 days.

(21) Appl. No.: 10/489,742

(22) PCT Filed: Jul. 20, 2002

(86) PCT No.: PCT/EP02/08114

§ 371 (c)(1),
(2), (4) Date: Sep. 15, 2004

(87) PCT Pub. No.: WO03/025233

PCT Pub. Date: Mar. 27, 2003

(65) Prior Publication Data

US 2005/0039825 A1    Feb. 24, 2005

(30) Foreign Application Priority Data

Sep. 15, 2001   (DE) ................................ 101 45 599

(51) Int. Cl.
    C21D 9/40    (2006.01)
(52) U.S. Cl. ...................... 428/472; 148/206; 148/210; 148/212; 148/214; 148/217; 148/225; 148/230; 148/232; 148/233; 148/316; 148/317; 148/318; 148/319; 428/216; 428/332; 428/336; 428/469; 428/698
(58) Field of Classification Search ................. 148/206, 148/210, 212, 214, 217, 219, 225, 232, 230, 148/233, 316, 317, 318, 319; 428/216, 332, 428/336, 469, 472, 698
See application file for complete search history.

(56) References Cited

U.S. PATENT DOCUMENTS

| 4,741,785 | A |   | 5/1988  | Welschof |
|-----------|---|---|---------|----------|
| 5,595,610 | A | * | 1/1997  | Maeda et al. ............... 148/233 |
| 5,669,988 | A |   | 9/1997  | Takenaka et al. |
| 5,737,975 | A | * | 4/1998  | Hanisch et al. ............... 74/567 |
| 5,861,067 | A | * | 1/1999  | Hetzner ...................... 148/326 |
| 5,916,383 | A | * | 6/1999  | Rokutanda et al. ......... 148/206 |
| 6,059,898 | A | * | 5/2000  | Fisher et al. ................ 148/319 |
| 6,083,455 | A | * | 7/2000  | Kurita et al. ............... 148/318 |
| 6,149,734 | A | * | 11/2000 | Isogai et al. ................ 148/319 |
| 6,224,687 | B1 | * | 5/2001  | Inoue ......................... 148/318 |
| 6,315,455 | B1 | * | 11/2001 | Tanaka et al. .............. 148/318 |
| 6,379,475 | B1 | * | 4/2002  | Kuehmann .................. 148/318 |
| 6,438,836 | B1 |   | 8/2002  | Barth et al. |
| 6,440,233 | B2 | * | 8/2002  | Okita et al. ................ 148/319 |
| 6,458,220 | B1 | * | 10/2002 | Kuehmann et al. ......... 148/319 |
| 6,531,000 | B1 | * | 3/2003  | Takemura et al. .......... 148/286 |

FOREIGN PATENT DOCUMENTS

| EP | 01098011   | * | 10/2000 |
| JP | 06079541   | * | 3/1994  |
| JP | 09078127   | * | 3/1997  |
| JP | 2001 226716 |   | 4/2001  |

* cited by examiner

Primary Examiner—Archene Turner

(57) ABSTRACT

The invention relates to components made of steel, more particularly outer joint parts and inner joint parts of constant velocity joints, and to a process of heat treating such components made of steel. The heat treatment operation includes the process stages of nitriding, induction surface layer hardening and tempering, which processes follow one another. As a result of the nitriding operation, the joint parts are provided with a surface layer (15) including nitrides and a diffusion layer (18) positioned thereunderneath. The subsequent induction hardening process causes the diffusion layer (18) to be hardened, so that it comprises good supporting characteristics for supporting the surface layer (15) positioned above same.

20 Claims, 2 Drawing Sheets

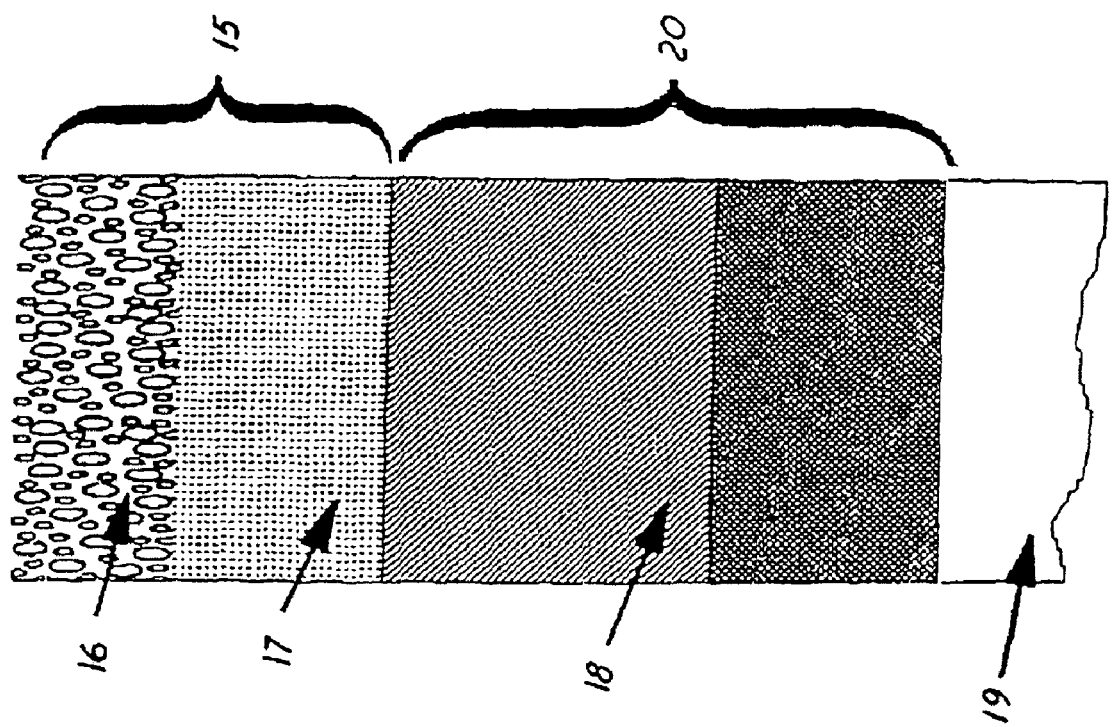

US 6,982,120 B2

HARDENED STEEL COMPONENTS AND PROCESS OF TREATING THE SAME

BACKGROUND

The invention relates to components made of steel for establishing contact with rolling contact members, more particularly outer joint parts (2) and inner joint parts (3) of constant velocity joints, as well as sleeves and journals of ball-guided longitudinal plunging pieces, and to a process of heat-treating such components.

In constant velocity joints with an outer joint part and an inner joint part and with torque transmitting rolling contact members which are held in running grooves in the outer part and inner part and roll therein, there occur high pressures between the rolling contact members and the running grooves in the inner part and outer part. Such loads which are present in the form of Hertzian pressure can lead to the formation of pitting which, in the final analysis, causes the constant velocity joints to fail. Similar conditions prevail in the case of ball-guided longitudinal plunging pieces provided for torque transmitting purposes wherein sleeves and journals each comprise longitudinal grooves in which balls are held and in which the balls roll.

In U.S. Pat. No. 4,741,785, there is known a process for partially surface-hardening running grooves in the outer joint part and inner joint part of a constant velocity ball joint wherein the contact faces of the running grooves and of the cage, which contact faces guide the balls, are hardened by means of a formed inductor. The depth of hardness of the running grooves amounts to 0.5 mm. The guiding faces of the inner joint part and of the outer joint part, which guiding faces are positioned between the running grooves and serve to guide the cage, are hardened by a second hardening process which produces smaller depths of hardness. For this purpose there are provided laser or electron beam hardening processes or, alternatively, thermo-chemical surface hardening process such as nitriding.

SUMMARY OF THE INVENTION

It is therefore an object of the present invention to provide components made of steel for establishing contact with rolling contact members as well as a process of heat-treating components made of steel wherein the running characteristics of the faces of the rolling contact members are improved, wherein wear protection is improved and thus the service life of the components extended.

The objective is achieved by components of said type made of steel having a surface layer comprising a pore containing seam of burnt iron nitrides and, positioned thereunderneath, a non-metallic connecting zone of iron nitrides, having an adjoining diffusion zone of nitrogen-enriched mixed crystals and precipitated nitrides in a matrix of a martensite-nitrogen structure, having an induction hardened layer at least in part superimposed on the diffusion zone, and having a core of heat-treatable steel positioned thereunderneath.

Furthermore, the objective is achieved by a process of heat-treating components of said type made of steel, comprising the below-mentioned process stages which follow one another: nitriding, surface layer induction hardening and tempering.

The advantage of the solutions in accordance with the invention is that, by applying a nitriding process preceding the induction hardening process, there is produced an outer surface layer which consists of iron nitrides as well as an adjoining diffusion zone which consists of nitrogen-enriched mixed crystals and precipitated nitrides in a matrix of N-martensite. The cooperation between the surface layer and the diffusion zone positioned thereunderneath is of the greatest significance. The diffusion zone which, initially, is relatively soft relative to the surface zone, after induction hardening, comprises a greater strength and hardness. Induction hardening after quenching, results in a hard martensite-nitrogen structure. In this way it is ensured that the induction-hardened diffusion zone positioned underneath the outer surface layer securely supports the surface layer. The formation of pitting on the running faces of the rolling contact members under operational conditions is prevented, as a result of which the service life of the components is prolonged.

According to one embodiment, the surface layer extends over the entire surface of the joint parts. Furthermore, at least partial regions of the components, more particularly the running grooves and guiding faces, are induction-hardened.

According to another embodiment, the surface layer has a thickness ranging between approximately 10 to 30 μm. The thickness of the surface layer, inter alia, depends on the nitriding process used. When using plasma nitriding, it is possible to achieve surface layer thicknesses of 10 to 20 μm, whereas in the case of salt bath nitriding, layer thicknesses of 20 to 30 μm are produced.

The surface layer comprises a pore containing seam of burnt iron nitrides and, thereunderneath, a connecting zone of iron nitrides. The pore seam has a thickness of approximately 2 to 3 μm and, depending on the nitriding process, the connecting zone complements the surface layer thickness to the above-mentioned thickness of 10 to 30 μm. The pore containing seam of burnt iron nitrides comprises a porous structure. In consequence, lubricant can enter the pores during operation, as a result of which lubrication between two contacting components can be improved considerably. In this way, the fretting tendency of the two components and thus component wear are reduced. The thickness of the pore containing seam can be reduced to nearly zero, if lubrication is less critical.

The connecting zone comprises ε-iron nitrides which comprise a high degree of hardness and a high fatigue strength and a high wear resistance. Components with nitrided and subsequently induction-hardened running faces thus comprise improved running characteristics, as a result of which the service life is extended.

The diffusion zone is preferably approximately 0.8 mm thick. The thickness of the induction-hardened layer amounts to approximately 1.8 to 2 mm. As a result of the induction hardening operation which follows nitriding, the structure of the diffusion zone obtains a greater hardness and strength. This is advantageous in that the relatively thin surface layer is supported by the diffusion zone. In this way, the risk of pitting under operational conditions is reduced.

According to a further embodiment of the invention, the steel used for the components is unalloyed. This is advantageous in that the material costs are relatively low. Preferably, use is made of Cf 53, i.e. steel with a carbon content of 0.53%.

In an alternative embodiment of the invention, the base material of the components is alloy steel which is more expensive than unalloyed steel, but has higher strength values after heat treatment.

The presence of alloying elements is not excluded.

The nitriding processes used to put the invention into effect are plasma nitriding, salt bath nitriding or gas nitriding. Gas nitriding requires long nitriding times of approximately 100 hours for a nitriding depth of 0.6 mm. As a result of ionisation of the nitrogen through glow discharge during plasma nitriding and by applying additional measures such as adding hydrogen and methane, the nitriding times can be shorter than in the case of gas nitriding. Even shorter nitriding times are achieved by salt bath nitriding, but the cyanide salt baths used typically lead to a slight recarburisation of the surface layer.

According to another embodiment of the inventive process, the components are nitrided at a temperature of approximately 580° C. In principle, it is also possible to nitride at lower temperatures, but in that case, inward diffusion of the nitrogen into the component takes longer.

According to another further embodiment of the process, surface layer induction hardening is carried out at a middle frequency, with the depth of current penetration and thus also the effective depth of hardening decreasing with an increasing frequency. According to an advantageous embodiment, the middle frequency ranges between 10 and 20 kilohertz. With a frequency of 10 kilohertz, the effective depth of hardening amounts to approximately 1.8 to 2 mm and with a frequency of 30 kilohertz, the effective depth of hardening ranges between 1.5 and 1.7 mm.

Tempering preferably takes place at a temperature of approximately 175° C. For the purpose of reducing hardness stresses, the components are heated in a furnace to said temperature which is then held for a period of approximately 1 hour. Higher tempering temperatures can lead to a reduced hardness of the diffusion zone and induction-hardened layer.

According to another embodiment of the process it is proposed that, prior to being nitrided, the components are normalized. Alternatively, the components can be heat-treated prior to being nitrided. To achieve a high degree of toughness and a fine grain at a certain tensile strength value, the components, during the heat treatment process, are quenched and tempered.

BRIEF DESCRIPTION OF THE DRAWINGS

A preferred embodiment will be explained with reference to the drawings wherein:

FIG. 3 shows part of the surface layer after nitriding and induction hardening.

DETAILED DESCRIPTION OF THE DRAWINGS

Figure 2:
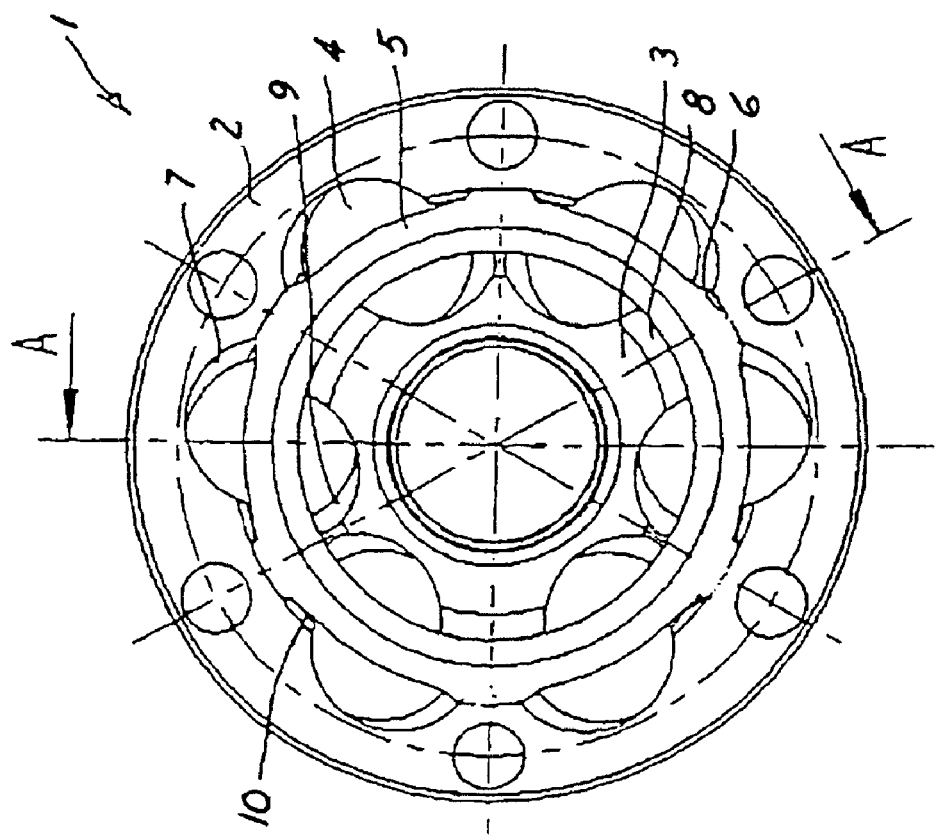
FIG. 2 is a cross-section through the inventive constant velocity plunging joint according to FIG. 1.
Figure 1:
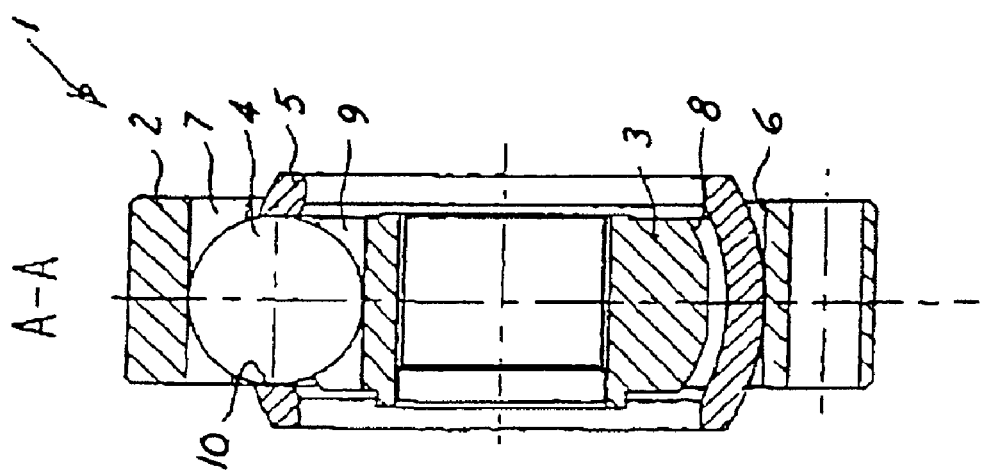
FIG. 1 is an axial section through an inventive constant velocity plunging joint.

FIGS. 1 and 2 will be described jointly below. They show a constant velocity plunging joint 1 in the form of a VL joint with an annular outer joint part 2 and an annular inner joint part 3 as well as balls 4 for transmitting torque between the two joint parts, and furthermore a cage 5 for guiding the balls 4. The outer joint part 2 comprises a cylindrical guiding face 6 for guiding the cage 5, and outer running grooves 7. The inner joint part 3 comprises an outer face 8 and an inner running grooves 9. The inner and outer running grooves 7, 9 form circumferentially alternating angles of intersection with the longitudinal axes of the outer joint part 2 and of the inner joint part 3. In inner and outer running grooves 7, 9 associated with one another there is guided a ball 4 held in a window 10 of the cage 5.

The outer joint part 2 is provided with bores 11 for bolting on a flange. The inner joint part 3 is provided with a longitudinally toothed aperture 12 for inserting a shaft. (not illustrated).

The outer joint part 2 and the inner joint part 3 comprise an unalloyed heat-treatable steel with a mean carbon content of 0.53% (Cf 53). Prior to being heat-treated, the joint parts are present in the normalized condition. In the course of heat treatment, the two joint parts 2, 3 are first nitrided, then induction-hardened and finally tempered. Prior to being heat-treated, the joint parts 2, 3 had already been precision-machined. There is no provision for further machining of the surfaces of the joint parts 2, 3 after heat treatment.

For nitriding the joint parts 2, 3, preference is given to plasma nitriding. In the case of plasma nitriding, nitriding takes place in a nitrogen-containing plasma which is produced with the help of glow discharging in a vacuum furnace. By applying a high direct current between the furnace wall and the workpiece, nitrogen ions are greatly accelerated and hit the workpiece surface at a high speed, with the joint parts being heated by the energy released by the nigrogen ions hitting the workpiece. In time, the formation of nitride progresses due to diffusion from the surface into the interior of the joint parts 2, 3.

Nitriding takes place at a temperature of approximately 580° C. held over a period of approximately 3 hours. As a result of diffusion, the nitrogen, because of its small atom radius, can easily penetrate into the iron grid of the upper layer of the joint parts 2, 3. In the process, the joint parts 2, 3 experience an increase in hardness, which increase results from the formation of nitrides and the dissolution of nitrogen in the mixed iron crystal. After nitriding, the outer layer of the joint parts 2, 3 comprises an outer surface layer with iron nitrides and an adjoining diffusion zone with nitrogen-enriched mixed crystals and partially precipitated nitrides.

After nitriding, the inner faces of the outer joint part 2, i.e. the surfaces of the running grooves 7 and of the guiding face 6, as well as the outer faces of the inner joint part 3, i.e. the surfaces of the running grooves 9 and of the outer face 8, are induction-hardened. In the course of induction hardening, the outer layer of the joint parts 2, 3 is heated in a middle frequency coil by induced current flows and, after the austenitising temperature has been reached, it is quenched in a shower or bath, and the polymer emulsion can be used as a coolant. The depth of the heated surface layer and thus also the surface layer hardness is reduced with an increasing frequency due to the skin effect With a middle frequency of 10 kilohertz, the effective depth of hardness amounts to approximately 1 to 2.8 mm and with a middle frequency of 30 kilohertz, the effect depth of hardness amounts to approximately 1 to 1.3 mm. However, the effective depth of hardness has to be kept as low as possible in order to prevent effusion of the connecting zone.

After induction hardening, the joint parts 2, 3 are tempered to reduce hardness stresses. Tempering takes place in an electrically heated tempering furnace at a temperature of 175° C. for a period of approximately 1 hour.

FIG. 3 shows the structure of the outer layer of the outer joint part 2 and of the inner joint part 3 after these have been nitrided and induction hardened. The thickness of the illustrated layers is not to scale.

It can be seen that the surface-layer 15 comprises a pore seam 16 and, thereunderneath, a connecting zone 17. The pore seam 16 has a thickness of approximately 2 to 3 micrometers. Together with the connecting zone 17 with a thickness of approximately 7 to 27 micrometers there is obtained a total thickness of approximately 10 to 30 micrometers for the surface layer 15. The thickness of the surface layer 15, inter alia, depends on the nitriding process used. In the case of plasma nitriding, it is possible to achieve surface thicknesses of 10 to 20 micrometers, whereas in the case of salt bath nitriding, layer thicknesses of 20 to 30 micrometers are produced.

The pore containing seam 16 consists of burnt iron nitrides and comprises a porous structure. It is thus possible for lubricant to enter the pores when the joint is in operation, as a result of which lubrication between the balls and the running groves of the constant velocity plunging joint is improved considerably. In this way, the tendency of the joint parts to fret and wear is reduced considerably. The connecting zone 17 consists of ε-iron nitrides which comprise high hardness and high fatigue strength values and a high wear resistance. The connecting zone 17 thus improves the running characteristecs of the constant velocity plunging joint, as a result of which the service life is prolonged.

The diffusion zone 18 positioned underneath the connecting zone 17 consists of a ferritic-pearlitic matrix with nitrogen-enriched mixed crystals and of precipitated nitrides. The depth of the diffusion zone 18 up to which the nitrogen is diffused into the basic structure amounts to 0.8 mm. Said diffusion zone 18 is softer than the surface layer 15 positioned thereabove, so that without any further heat treatment there would be a risk of the surface layer 15 being pushed into the diffusion zone 18. Underneath the diffusion zone 18 there is positioned the core 19 of the joint parts which remains mains unaffected by the nitriding process. The structure of the core 19 consists of pearlite and ferrite (normalised), with the grain size amounting to 5 to 8 according to ASTM Standard E 112 (American Society for Testing and Materials).

As a result of the induction hardening process following the nitriding operation, the hardness of the joint part is increased further. The thickness of the induction hardened layer 20 amounts to approximately 1.8 to 2 mm. As can be seen, the induction hardened layer 20 is superimposed on the diffusion zone 18 and extends beyond same. The hardening resulting from induction hardening, during the quenching operation, leads to the formation of a martensite-nitrogen structure in the diffusion zone 18 which comprises high hardness and strength values. The induction-hardened diffusion zone 18 is thus hard enough to support the relatively thin surface layer 15 which is in contact with the balls and the cage respectively. Wear caused by the formation of pitting on the running surfaces is reduced, as a result of which the service life of the constant velocity plunging joint is prolonged.

LIST OF REFERENCE NUMBERS 1 constant velocity joint
2 outer joint part
3 inner joint part
4 balls
5 cage
6 guiding face
7 running groove
8 outer face
9 running groove
10 window
11 bore
12 aperture
13
14
15 surface layer
16 pore containing seam
17 connecting zone
18 diffusion zone
19 core
20 induction hardened layer

What is claimed is:

1. A wear-resistant steel component comprising:
   a surface layer (15) comprising a pore containing seam (16) of burnt iron nitrides and, positioned thereunderneath, a non-metallic connecting zone (17) of iron nitrides;
   a diffusion zone (18) of nitrogen-enriched mixed crystals and precipitated nitrides in a matrix of a martensite-nitrogen structure;
   an induction hardened layer (20) at least in part superimposed on the diffusion zone (18), the diffusion zone (18) positioned underneath the connecting zone (17); and
   a core (19) of heat-treatable steel positioned underneath the induction hardened layer (20).

2. A component according to claim 1, wherein the surface layer (15) formed of the pore containing seam (16) and the connecting zone (17) extends over an entire contact surface.

3. A component according to claim 2, wherein at least part of the contact surface is induction-hardened.

4. A component according to claim 1, wherein the surface layer (15) formed of the pore containing seam (16) and the connecting zone (17) has a thickness of approximately 10 to 30 μm.

5. A component according to claim 4, wherein the pore containing seam (16) has a thickness of approximately 2 to 3 μm.

6. A component according to claim 1, wherein the diffusion zone (18) has a thickness of approximately 0.8 μm.

7. A component according to claim 1, wherein the induction hardened layer (20) has a thickness of approximately 1.8 to 2 mm.

8. A component according to claim 1, wherein the core (19) is normalised.

9. A component according to claim 1, wherein the steel is an unalloyed heat-treatable steel.

10. A component according to claim 9, wherein the steel consists of Cf 53.

11. A component according to claim 1, wherein the steel is alloy steel.

12. A process of heat treating steel components comprising the following steps:
    nitriding a region of the component;
    thereafter, surface layer induction hardening the region; and
    thereafter, tempering the region such that the resulting steel components each comprise a surface layer of a pore containing seam of burnt iron nitrides followed by a non-metallic connecting zone of iron nitrides on a diffusion one of nitrogen-enriched mixed crystals and precipitatad nitrides in a matrix of a martensite-nitrogen structure over an induction hardened layer which is at least partially superimposed on the diffusion zone, and a core of heat-treatable steel underneath the induction hardened layer.

13. A process according to claim 12, wherein the step of the nitriding includes at least one of plasma nitriding, salt bath nitriding, or gas nitriding.

14. A process according to claim 12, wherein the step of nitriding is carried out at a temperature of approximately 580° C.

15. A process according to claim 12, wherein the step of surface layer induction hardening takes place at a middle frequency ranging between 10 and 30 kHz.

16. A process according to claim 12, wherein the step of tempering takes place at a temperature of approximately 175° C.

17. A process according to claim 12, wherein the steel components comprise unalloyed steel.

18. A process according to claim 12, wherein the steel components comprise alloy steel.

19. A process according to claim 12 comprising the step of normalizing the components prior to them being nitrided.

20. A process according to claim 12 comprising heat treating the components prior to them being nitrided.

* * * * *